US012659616B2

(12) United States Patent
Bartov et al.

(10) Patent No.: US 12,659,616 B2
(45) Date of Patent: Jun. 16, 2026

(54) SENSING CIRCUIT COMPENSATION

(71) Applicant: Applied Materials Israel Ltd.,
Rehovot (IL)

(72) Inventors: Avishai Bartov, Hod Hasharon (IL);
Elad Ilan, Rehovot (IL); **Moriya
Rosenfeld**, Rehovot (IL)

(73) Assignee: Applied Materials Israel Ltd.,
Rehovot (IL)

( * ) Notice: Subject to any disclaimer, the term of this
patent is extended or adjusted under 35
U.S.C. 154(b) by 113 days.

(21) Appl. No.: 18/671,811

(22) Filed: May 22, 2024

(65) Prior Publication Data

US 2025/0365520 A1 Nov. 27, 2025

(51) Int. Cl.
*H04N 25/671* (2023.01)
*H04N 17/00* (2006.01)
*H04N 25/51* (2023.01)
*H04N 25/77* (2023.01)

(52) U.S. Cl.
CPC ......... *H04N 25/671* (2023.01); *H04N 17/002*
(2013.01); *H04N 25/51* (2023.01); *H04N
25/77* (2023.01)

(58) Field of Classification Search
CPC .... H04N 25/671; H04N 17/002; H04N 25/51;
H04N 25/77; H04N 25/57; H04N 25/571;
H04N 25/575; H04N 25/581; H04N
25/585; H04N 25/59; H04N 25/771;
H04N 17/004; H04N 2201/0001; H04N
2201/0003; H04N 2201/0005; H04N
2201/0006

USPC ......................................... 348/180, 187, 188
See application file for complete search history.

(56) References Cited

U.S. PATENT DOCUMENTS

| | | | |
|---|---|---|---|
| 11,644,426 B2 | 5/2023 | Simovitch | |
| 2014/0247332 A1* | 9/2014 | Kummailil | G02B 23/2484 |
| | | | 348/187 |
| 2023/0088705 A1* | 3/2023 | Lim | H04N 25/79 |
| | | | 348/241 |
| 2023/0224608 A1* | 7/2023 | Lim | H04N 25/47 |
| | | | 348/207.99 |
| 2024/0073553 A1* | 2/2024 | Asakura | H04N 25/671 |
| 2024/0259705 A1* | 8/2024 | Velichko | H04N 25/571 |

\* cited by examiner

*Primary Examiner* — Albert H Cutler
(74) *Attorney, Agent, or Firm* — Kilpatrick Townsend &
Stockton LLP

(57) ABSTRACT

An inspection system that includes multiple pixel circuits, a
readout circuit and a processing circuit. The multiple pixel
circuits are configured to generate detection signals. The
readout circuit is configured to read the detection signals.
The processing circuit is configured to process the detection
signals by applying one or more compensation functions.
The one or more compensation functions are determined
based on pixel circuit gain functions. For each pixel circuit,
a pixel circuit gain function includes a set of a group of pixel
circuit related values that include a sub-set of border region
pixel circuit related values that are located within a border
region of the pixel circuit dynamic range. The border region
includes a border between the first part of the pixel circuit
dynamic range and the second part of the pixel circuit
dynamic range.

11 Claims, 8 Drawing Sheets

Figure 1:
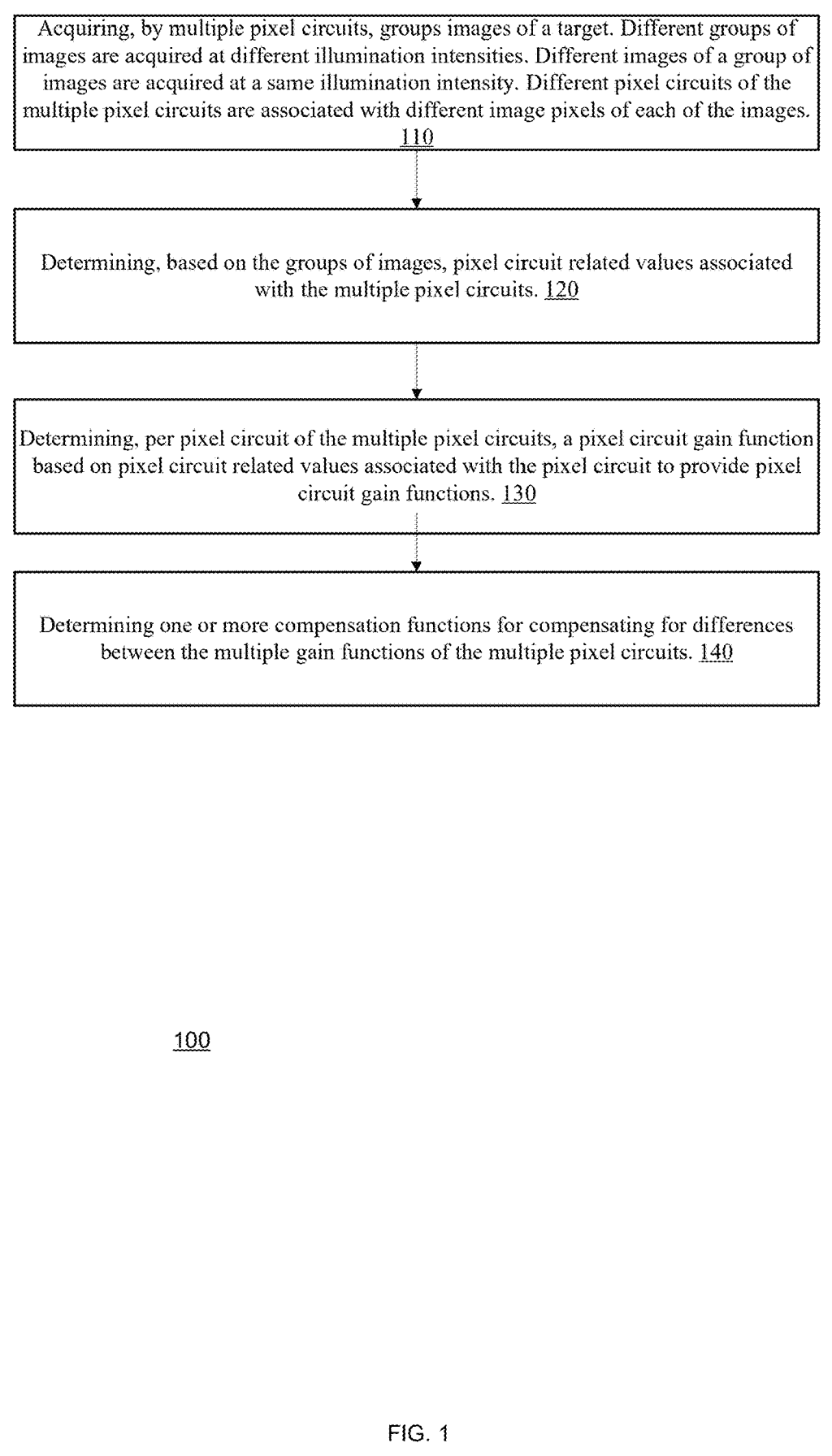

Acquiring, by multiple pixel circuits, groups images of a target. Different groups of images are acquired at different illumination intensities. Different images of a group of images are acquired at a same illumination intensity. Different pixel circuits of the multiple pixel circuits are associated with different image pixels of each of the images. 110

Determining, based on the groups of images, pixel circuit related values associated with the multiple pixel circuits. 120

Determining, per pixel circuit of the multiple pixel circuits, a pixel circuit gain function based on pixel circuit related values associated with the pixel circuit to provide pixel circuit gain functions. 130

Determining one or more compensation functions for compensating for differences between the multiple gain functions of the multiple pixel circuits. 140

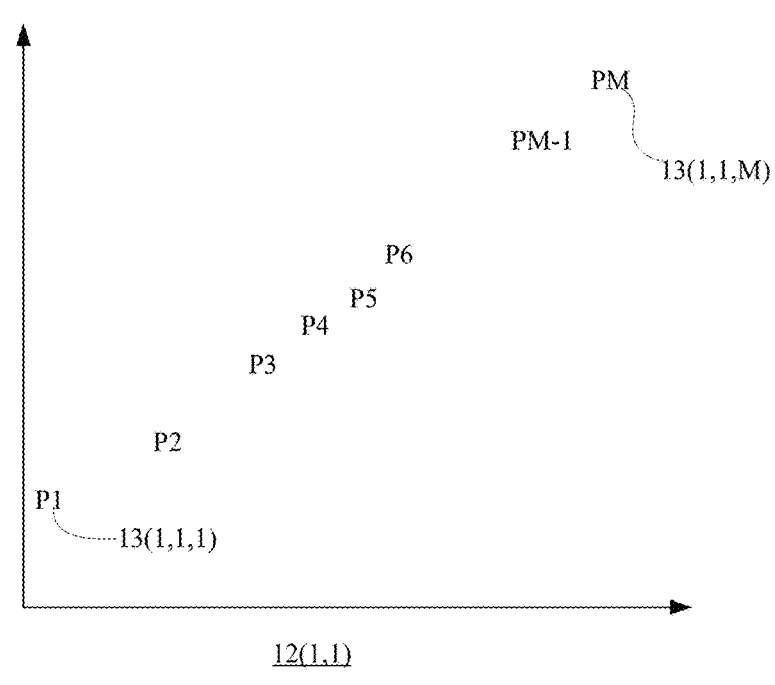
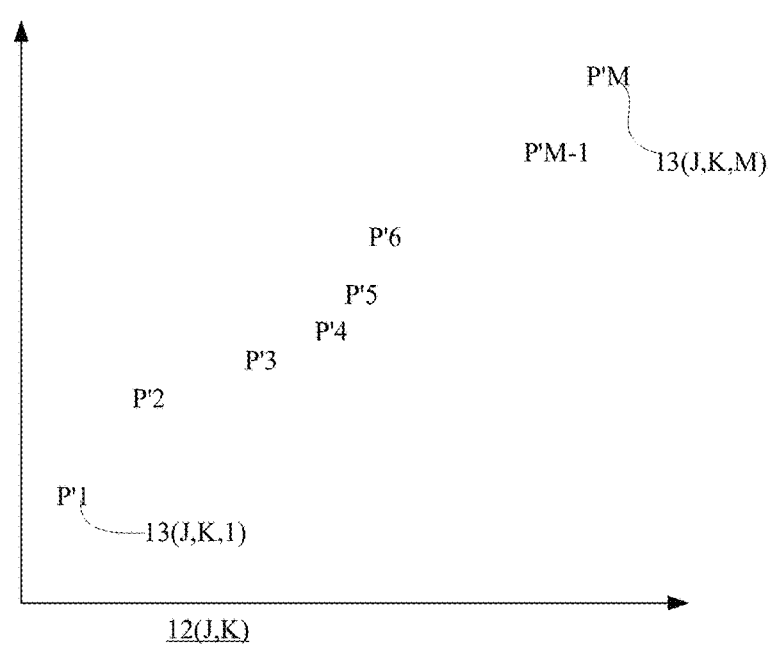
FIG. 5

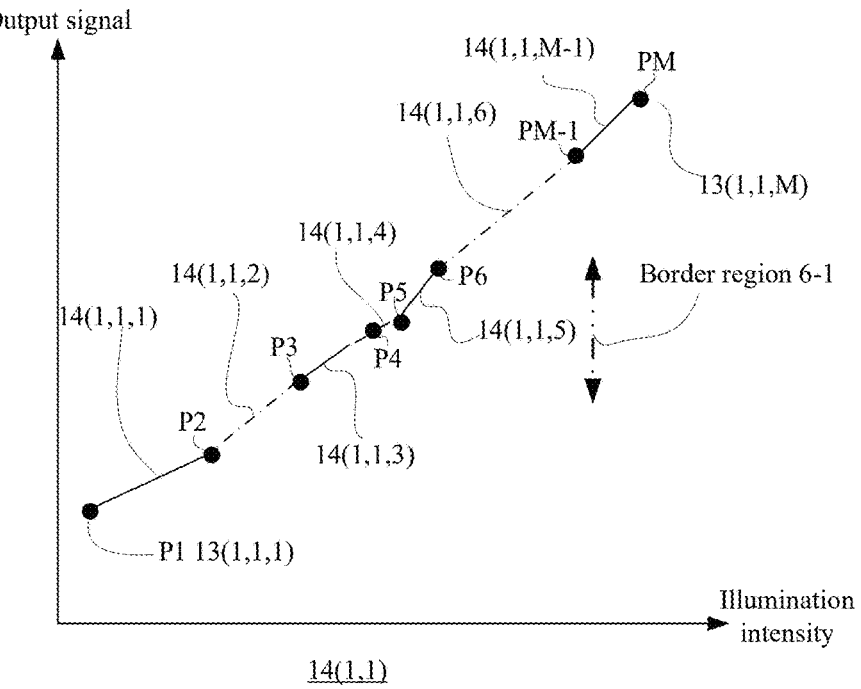
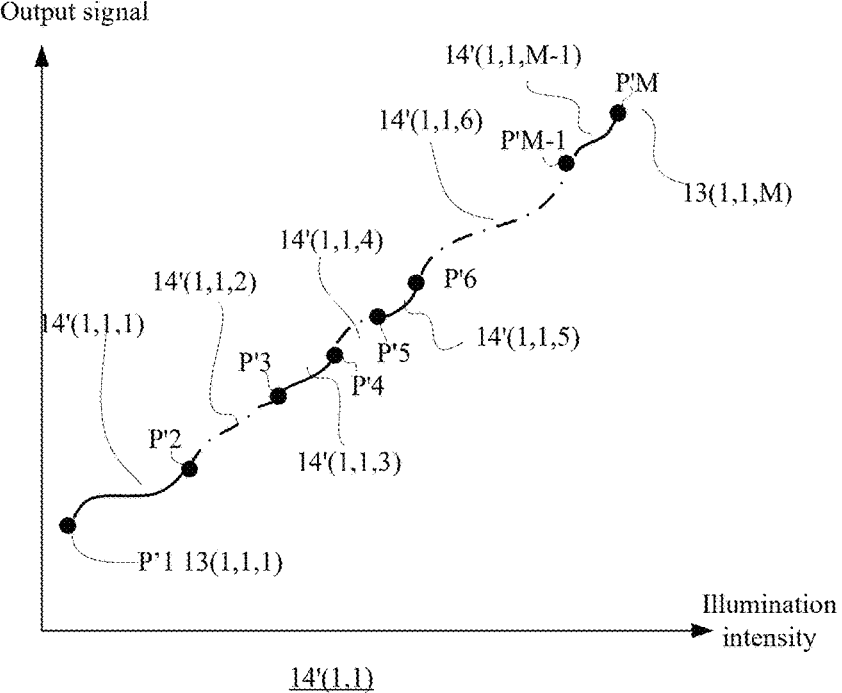
FIG. 6

Figure 7:
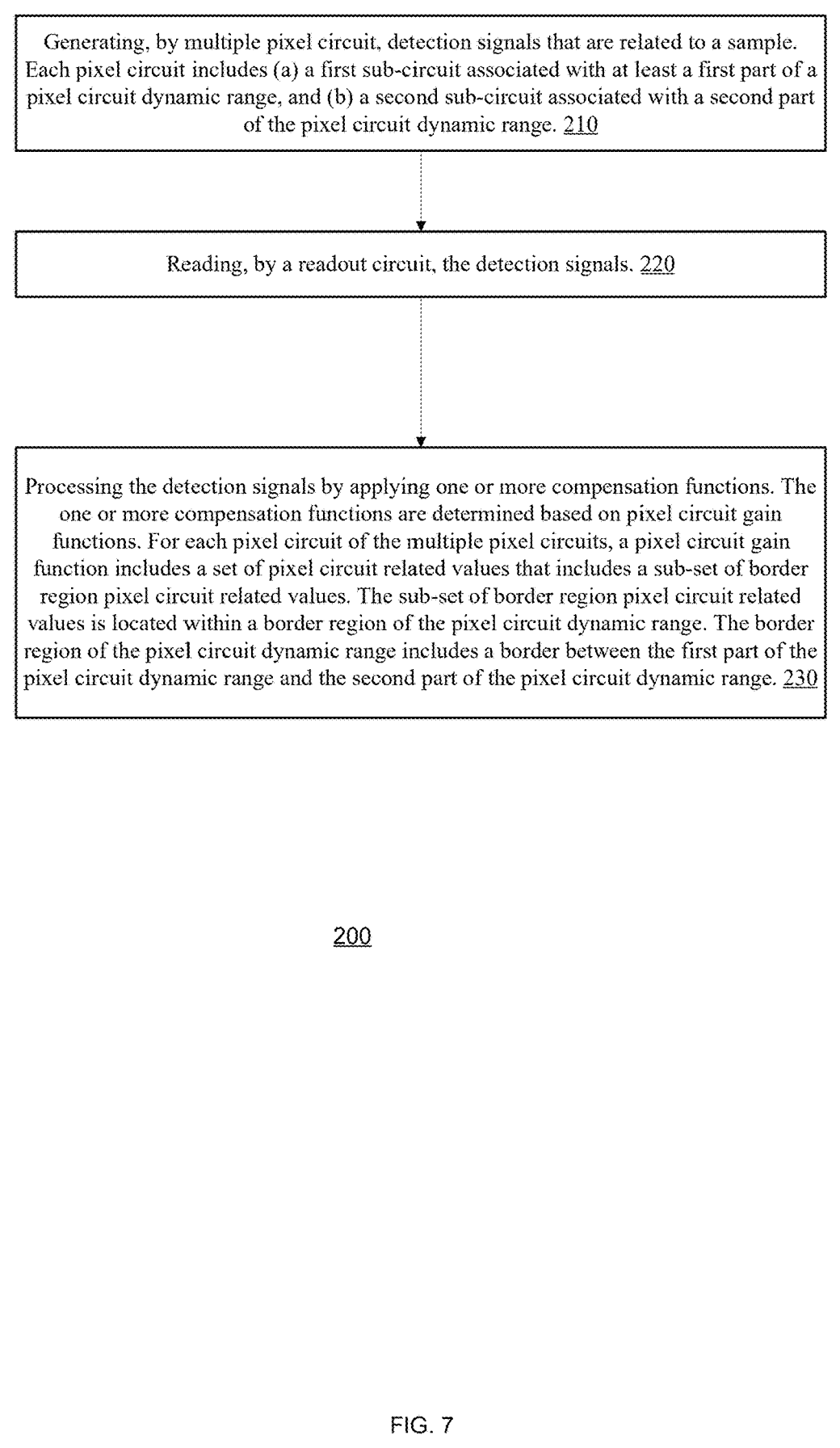

Generating, by multiple pixel circuit, detection signals that are related to a sample. Each pixel circuit includes (a) a first sub-circuit associated with at least a first part of a pixel circuit dynamic range, and (b) a second sub-circuit associated with a second part of the pixel circuit dynamic range. 210

Reading, by a readout circuit, the detection signals. 220

Processing the detection signals by applying one or more compensation functions. The one or more compensation functions are determined based on pixel circuit gain functions. For each pixel circuit of the multiple pixel circuits, a pixel circuit gain function includes a set of pixel circuit related values that includes a sub-set of border region pixel circuit related values. The sub-set of border region pixel circuit related values is located within a border region of the pixel circuit dynamic range. The border region of the pixel circuit dynamic range includes a border between the first part of the pixel circuit dynamic range and the second part of the pixel circuit dynamic range. 230

Readout circuit 303

Processing circuit 305

300

SENSING CIRCUIT COMPENSATION

BACKGROUND OF THE INVENTION

A sensor unit includes multiple pixel circuits.

Each pixel circuit exhibits a dynamic range—the range of radiation intensities that is detectable by the pixel circuit—from the lowest radiation intensity detectable by the pixel circuit to a highest radiation intensity that saturates the pixel circuit.

Each pixel circuit exhibits a non-linear mapping between an intensity of radiation sensed by the pixel circuit and an intensity of a detection signals outputted by the pixel circuit. The non-linear mapping is also referred to as a response of the pixel circuit. The non-linear mapping may be illustrated by a gain curve.

In addition, there is also a difference between responses of some of the pixel circuits of the sensor unit.

There is a growing need to compensate for the non-linearity of the non-linear mapping and to compensate for the differences between the responses of some of the pixel circuits.

BRIEF SUMMARY OF THE INVENTION

There is provided an inspection system that includes multiple pixel circuits, a readout circuit and a processing circuit. The multiple pixel circuits are configured to generate detection signals. The readout circuit is configured to read the detection signals. The processing circuit is configured to process the detection signals by applying one or more compensation functions. The one or more compensation functions are determined based on pixel circuit gain functions. For each pixel circuit, a pixel circuit gain function includes a set of a group of pixel circuit related values that include a sub-set of border region pixel circuit related values that are located within a border region of the pixel circuit dynamic range. The border region includes a border between the first part of the pixel circuit dynamic range and the second part of the pixel circuit dynamic range.

There is provided a method for image acquisition, the method includes: generating, by multiple pixel circuit, detection signals that are related to a sample; wherein each pixel circuit includes (a) a first sub-circuit associated with at least a first part of a pixel circuit dynamic range, and (b) a second sub-circuit associated with a second part of the pixel circuit dynamic range; reading, by a readout circuit, the detection signals; and processing the detection signals by applying one or more compensation functions; wherein the one or more compensation functions are determined based on pixel circuit gain functions, wherein for each pixel circuit of the multiple pixel circuits, a pixel circuit gain function includes a set of a group of pixel circuit related values that includes a sub-set of border region pixel circuit related values that are located within a border region of the pixel circuit dynamic range, the border region of the pixel circuit dynamic range includes a border between the first part of the pixel circuit dynamic range and the second part of the pixel circuit dynamic range.

There is provided a method for sensing circuit compensation, the method includes acquiring, by multiple pixel circuits, groups of images of a target, wherein different groups of images are acquired at different illumination intensities, wherein for each group of images, different images of the group of images are acquired at a same illumination intensity, wherein different pixel circuits of the multiple pixel circuits are associated with different image pixels of each of the images; each pixel circuit includes (a) a first sub-circuit associated with at least a first part of a pixel circuit dynamic range, and (b) a second sub-circuit associated with a second part of the pixel circuit dynamic range; determining, based on the groups of images, pixel circuit related values associated with the multiple pixel circuits; determining, per pixel circuit of the multiple pixel circuits, a pixel circuit gain function based on pixel circuit related values associated with the pixel circuit to provide pixel circuit gain functions; and determining one or more compensation functions for compensating for differences between the multiple gain functions of the multiple pixel circuits; wherein for each pixel circuit of the multiple pixel circuits, the pixel circuit is associated with a group of pixel circuit related values that comprise a sub-set of border region pixel circuit related values that are located within a border region of the pixel circuit dynamic range, the border region of the pixel circuit dynamic range includes a border between the first part of the pixel circuit dynamic range and the second part of the pixel circuit dynamic range.

BRIEF DESCRIPTION OF THE DRAWINGS

The subject matter regarded as the embodiment is particularly pointed out and distinctly claimed in the concluding portion of the specification. The embodiment, however, both as to organization and method of operation, together with specimen s, features, and advantages thereof, may best be understood by reference to the following detailed description when read with the accompanying drawings in which:

FIG. 1 illustrates an example of a method;

FIG. 5 illustrates an example of first pixel circuit related values and of a last pixel circuit related values;

FIG. 6 illustrates an example of a first pixel circuit gain function and of a last compensation function;

FIG. 7 illustrates an example of a method; and

Figure 2:
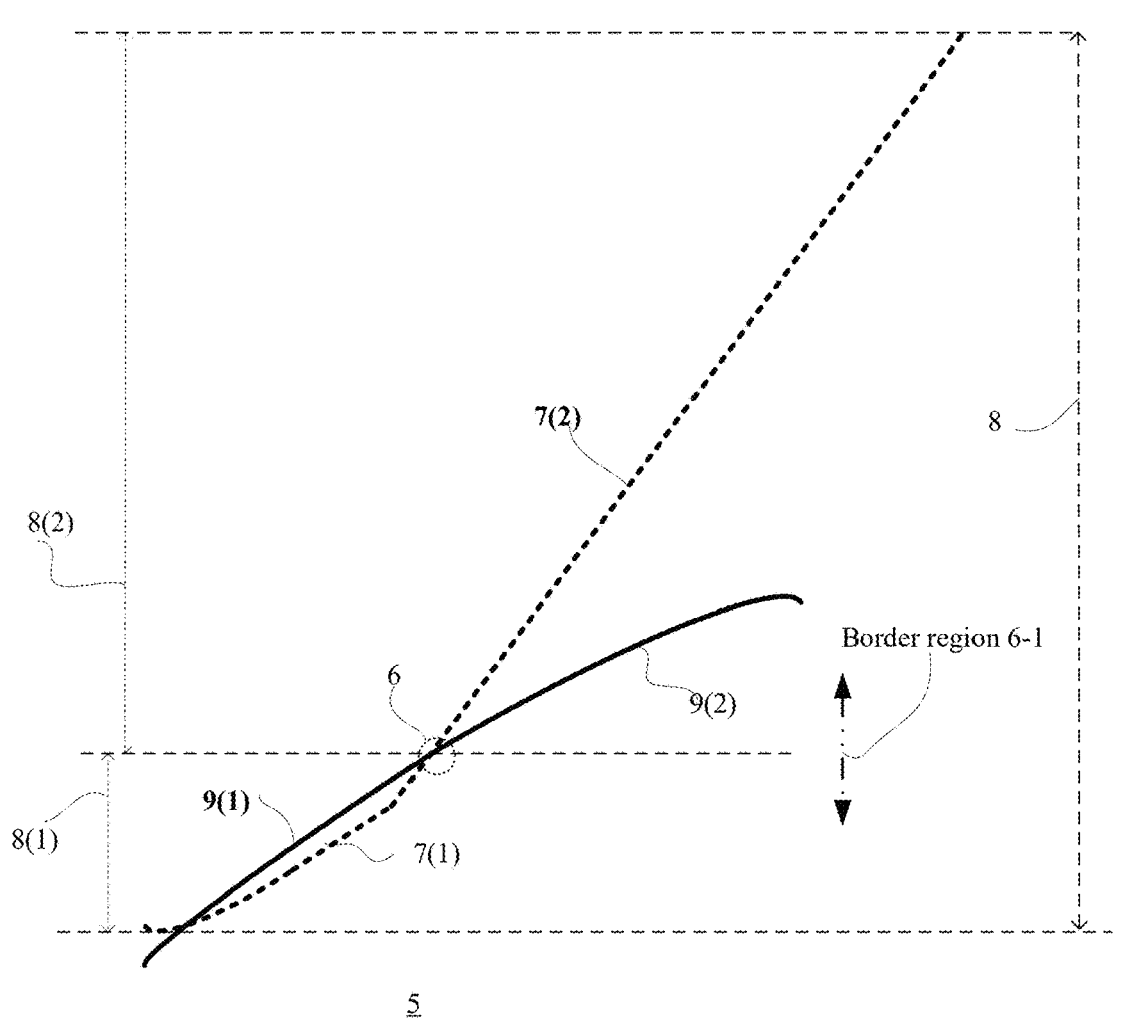
FIG. 2 illustrates an example of a first sub-circuit gain curve, and a second sub-circuit gain curve.

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

DETAILED DESCRIPTION OF THE INVENTION

FIG. 1 is an example of method 100 for sensing circuit compensation.

According to an embodiment, method 100 includes step 110 of acquiring, by multiple pixel circuits, groups images of a target. Different groups of images are acquired at different (for example—M) illumination intensities. Different (for example—N) images of a group of images are acquired at a same illumination intensity.

Different pixel circuits of the multiple pixel circuits are associated with different image pixels of each of the images. For example—assuming that there are J by K pixel circuits and that there are J by K image pixels, then for j between 1 and J and for k between 1 and K—a (j,k)'th image pixel is sensed by a (j,k)'th pixel circuit.

Each pixel circuit includes (a) a first sub-circuit associated with at least a first part of a pixel circuit dynamic range, and (b) a second sub-circuit associated with a second part of the pixel circuit dynamic range. For example—the first sub-circuit includes a first capacitor that is used for low intensity sensing and the second sub-circuit includes a second capacitor that is used for high intensity sensing. According to an embodiment the first capacitor is also used form high intensity sensing.

According to an embodiment, step 110 is followed by step 120 of determining, based on the groups of images, pixel circuit related values associated with the multiple pixel circuits.

According to an embodiment, for each pixel circuit of the multiple pixel circuits, the pixel circuit is associated with a group of pixel circuit related values (see for example P1 till PM and P'1 till P'M of FIG. 6) that include a sub-set of border region pixel circuit related values that are located within a border region (denoted 6-1 in FIG. 2) of the pixel circuit dynamic range, the border region of the pixel circuit dynamic range includes a border (denoted 6 in FIG. 2) between the first part of the pixel circuit dynamic range and the second part of the pixel circuit dynamic range.

According to an embodiment, there are more than three different illumination intensities, wherein step 120 includes finding (per pixel circuit) more than three pixel circuit related values.

According to an embodiment, there are more than three groups of images. Step 120 includes averaging (per pixel circuit) values of image pixels associated with the pixel circuit, per each group of images to provide at least three pixel circuit related values.

According to an embodiment, the averaging is followed by determining (per pixel circuit) a part of the pixel circuit gain function between each pair of adjacent pixel circuit related values. Different parts of the pixel circuit gain function are associated with different intensity subranges.

According to an embodiment, step 120 is followed by step 130 of determining, per pixel circuit of the multiple pixel circuits, a pixel circuit gain function based on pixel circuit related values associated with the pixel circuit to provide pixel circuit gain functions.

The determining of the pixel circuit gain function can be determined based in any manner.

a. According to an embodiment the pixel circuit gain function can be determined based on a segment to segment basis, each segment is defined between pair of adjacent pixel circuit related values.

b. According to an embodiment the pixel circuit gain function is not determined based on a segment to segment basis.

c. According to an embodiment, there are J1 parts of the pixel circuit gain function, wherein J1 is an integer that exceeds one, wherein different parts of the pixel circuit gain function are determined based on different sets of pixel circuit related values, wherein at least one set comprises more than two pixel circuit related values.

d. According to an embodiment the pixel circuit gain function maintains all of the pixel circuit related values.

e. According to an embodiment the pixel circuit gain function is not required to maintain any of the pixel circuit related values.

f. According to an embodiment the pixel circuit gain function is not required to maintain only a part of the pixel circuit related values.

g. According to an embodiment the pixel circuit gain function is a polynomial function.

h. According to an embodiment the pixel circuit gain function is a logarithmic function.

i. According to an embodiment the pixel circuit gain function is an exponential function.

j. According to an embodiment the pixel circuit gain function is a machine learning generated function.

k. According to an embodiment the pixel circuit gain function is a regression based function.

l. According to an embodiment, pixel circuit gain function is determined based on one of more of the pixel circuit gain function mentioned above. The term "based on" may include, for example, a combination of, a subtraction for, an approximation of, and the like.

According to an embodiment the pixel circuit gain function is selected based on constraints such as computational resource consumption, memory resource consumption, available memory resources, available memory resources, gain sensor correction resolution, inspection recipe, and the like.

According to an embodiment, step 130 includes determining (per pixel circuit) a part of the pixel circuit gain function between each pair of adjacent pixel circuit related values.

According to an embodiment, at least one part of the pixel circuit gain function is linear.

According to an embodiment, at least one part of the pixel circuit gain function is nonlinear.

According to an embodiment, step 130 includes determining a polygon or a single line that approximates the pixel circuit related values.

According to an embodiment, for each pixel circuit, a density of the border region pixel circuit related values exceeds a density of pixel circuit related values located outside the border region. A density of pixel circuit related values is a number of pixel circuit related values per a given intensity of illumination range.

This uneven sampling distribution provide more information within the border region—in order to improve the stitching between the parts of the pixel circuit dynamic range.

According to an embodiment, step 130 is followed by step 140 of determining one or more compensation functions for compensating for differences between the multiple gain functions of the multiple pixel circuits.

The one or more compensation function are configured to reverse changes between different pixel circuit gain functions.

Once applied on the multiple pixel circuits, the one or more compensation functions provide evenly valued image pixels when an image of a monochromatic object of a single color intensity is captured by the multiple pixel circuits.

According to an embodiment, the one or more compensation functions are also determined to compensate for optical system irregularities and/or optical system misalignments and/or compensate for temperature changes and/or compensate for changes between one scan of the sample to another.

According to an embodiment, the method includes compensating by performing a partial version of method 100— the partial means performing less illuminations of different illumination intensities and/or amending the pixel circuit gain functions and not calculating the pixel circuit gain functions from scratch.

Accordingly, method 100 calculates pixel circuit gain functions by obtaining a first number of groups of images, whereas the amendment (or adjusting) of the pixel circuit gain functions is preceded by an acquisition of a second number of groups of images, the second number is lower than the first number.

FIG. 2 illustrates an example of a pixel circuit dynamic range 8 that includes a first part 8(1), a second part 8(2), a border 6 between the first part and the second part, and border range 6-1.

FIG. 2 also illustrates a first sub-circuit gain function 7, and a second sub-circuit gain function 9. The first sub-circuit gain function 7 includes a first low intensity part 7(1) and a first high intensity part 7(2). The second sub-circuit gain function 9 includes a second low intensity part 9(1) and a second high intensity part 9(2).

A pixel circuit gain function is formed by stitching the first low intensity part 7(1) to the second high intensity part 9(2)—to provide a coverage of the entire pixel circuit dynamic range 8. The first low intensity part 7(1) intersects the second high intensity part 9(2) at border 6.

Figure 3:
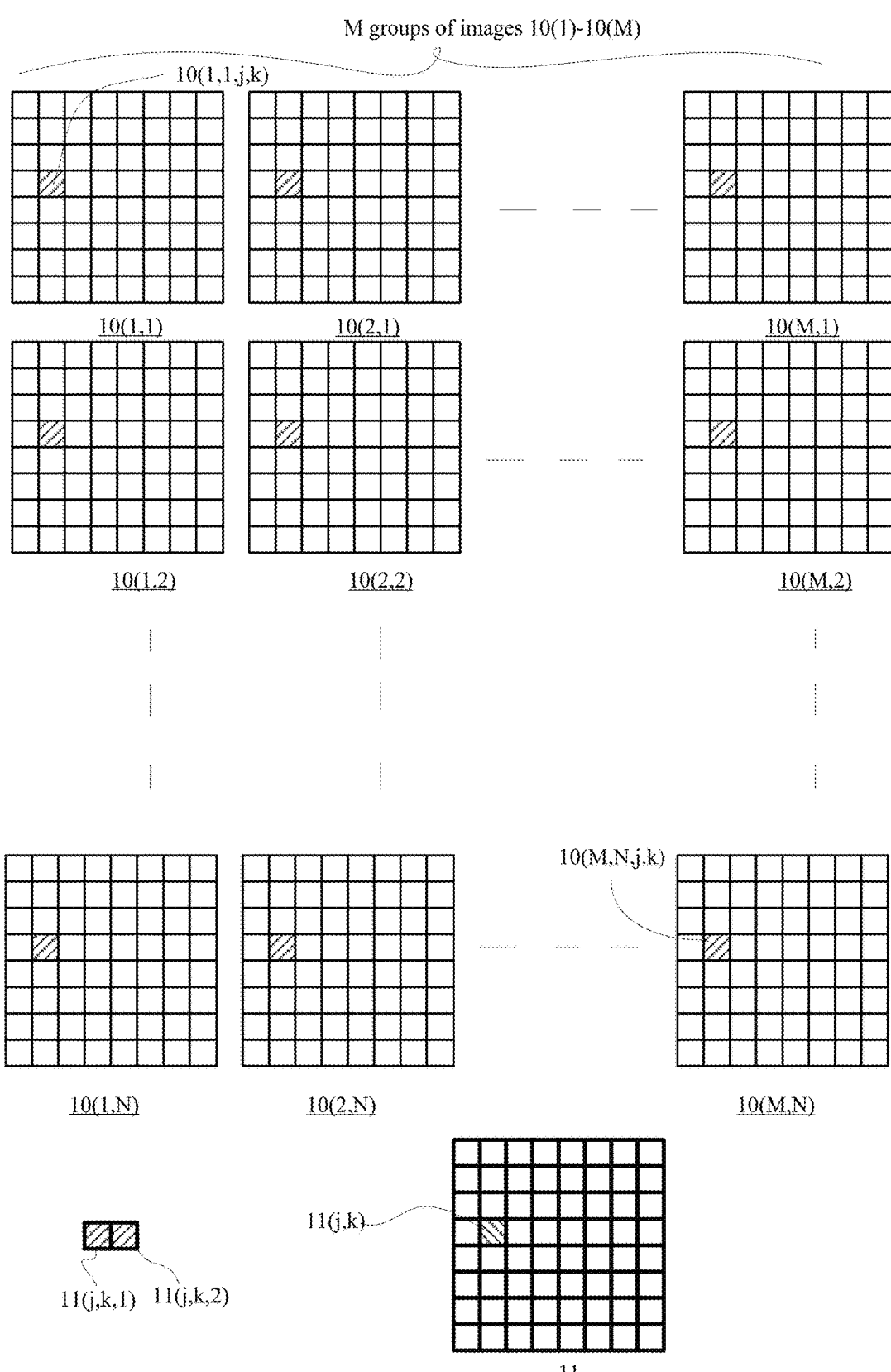
FIG. 3 illustrates an example of a M groups of images of a target and of and array of pixel circuits.

FIG. 3 illustrates an example of M groups of images of a target that are acquired during step 110.

According to an embodiment, the target is of a single color and uniform color intensity.

There are M by M images 10(1,1) till 10(M,N) that belong to M groups 10(1)-10(M). The m'th group (m ranges between 1 and M) includes images 10(m,1)-10(m,N).

FIG. 3 also illustrates an example of a certain (j,k)'th image pixel of different images. See, for example image pixel 10(1,1,$j,k$) of image 10(1,1) and image pixel 10(M,N, j,k) of image 10(M,N).

FIG. 3 also illustrates an array 17 of pixel circuits. The array includes J by K pixel circuits. Certain pixel circuit 17($j,k$) is associated with any of the certain (j,k)'th image pixels. Certain pixel circuit 17($j,k$) is illustrates as including a first sub-circuit 17($j,k$,1) and a second sub-circuit 17($j,k$,2).

Figure 4:
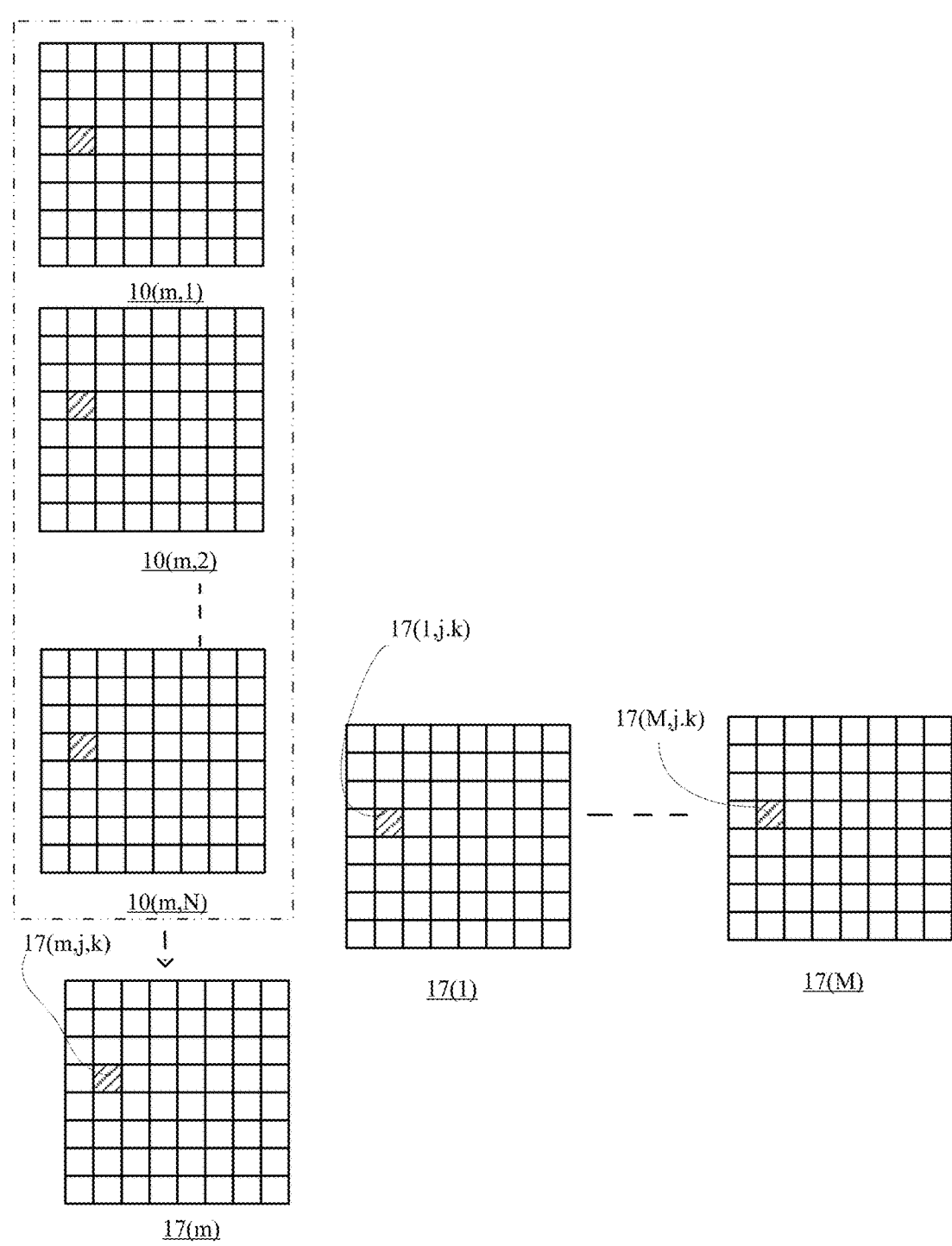
FIG. 4 illustrates an example of an averaging of images.

FIG. 4 illustrates an averaging of images (10(m,1)-10(m, N) of a m'th group of images to provide an average image 17(m). FIG. 4 also shows M average images 17(1)-17(M) and various average image pixels 17(1,$j,k$)-17(M,j,k) and 17($m,j,k$).

Per each pixel circuit that are M average image pixels—one per intensity (one per a group of images)—that correspond to M points (or M samples) of a pixel circuit gain function.

FIG. 5 illustrates:

a. First pixel circuit gain function 12(1,1) of a first pixel circuit (the (1,1)'th pixel circuit) that initially includes M pixel circuit related values denoted P1-PM 13(1,1, 1)-13(1,1,M).

b. Last pixel circuit gain function 12(J,K) of a last pixel circuit (the (J,K)'th pixel circuit) that initially includes M pixel circuit related values denoted P'1-P'M 13(J,K, 1)-13(J,K,M).

FIG. 6 illustrates an example of a first pixel circuit gain function 14(1,1) of a first pixel circuit (the (1,1)'th pixel circuit), and an example of a last pixel circuit gain function 14'(1,1) of a last pixel circuit (the (J,K)'th pixel circuit).

Each pixel circuit gain function has (M−1) parts—each part is defined between a pair of adjacent pixel circuit related values. The first pixel circuit gain function 14(1,1) includes first pixel circuit gain function parts 14(1,1,1) till 14(1,1, M−1). The last pixel circuit gain function 14'(1,1) includes last pixel circuit gain function parts 14'(1,1,1) till 14'(1,1, M−1). The first pixel circuit gain function parts 14(1,1,1) till 14(1,1,M−1) are linear. The last pixel circuit gain function parts 14'(1,1,1) till 14'(1,1,M−1) are nonlinear.

FIG. 7 illustrates an example of method 200 for image acquisition.

According to an embodiment, method 200 is executed using pixel circuits that were calibrated using method 100.

According to an embodiment, method 200 includes step 210 of generating, by multiple pixel circuit, detection signals that are related to a sample. Each pixel circuit includes (a) a first sub-circuit associated with at least a first part of a pixel circuit dynamic range, and (b) a second sub-circuit associated with a second part of the pixel circuit dynamic range.

According to an embodiment, step 210 is followed by step 220 of reading, by a readout circuit, the detection signals.

According to an embodiment, step 220 is followed by step 230 of processing the detection signals by applying one or more compensation functions. The one or more compensation functions are determined based on pixel circuit gain functions.

For each pixel circuit of the multiple pixel circuits, a pixel circuit gain function includes a set of pixel circuit related values that includes a sub-set of border region pixel circuit related values.

The sub-set of border region pixel circuit related values is located within a border region of the pixel circuit dynamic range. The border region of the pixel circuit dynamic range includes a border between the first part of the pixel circuit dynamic range and the second part of the pixel circuit dynamic range.

The border region is about less than 20, 15, 10 or even 5 percent than the pixel circuit dynamic range.

Figure 8:
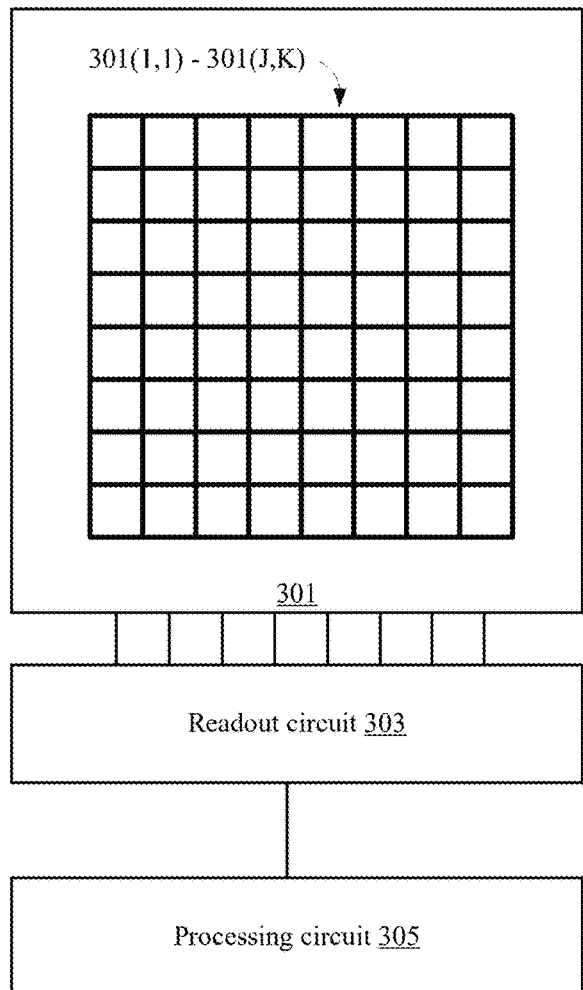
FIG. 8 illustrates an example of an inspection system.

FIG. 8 is an example of an inspection system 300.

According to an embodiment, inspection system 300 includes multiple pixel circuits 301(1,1)-301(J,K) of sensing unit 301, a readout circuit 303, and a processing circuit 305.

According to an embodiment, the multiple pixel circuits 301(1,1)-301(J,K) are configured to generate, detection signals that are related to a sample. Each pixel circuit includes (a) a first sub-circuit associated with at least a first part of a pixel circuit dynamic range, and (b) a second sub-circuit associated with a second part of the pixel circuit dynamic range.

According to an embodiment, readout circuit 303 is configured to read the detection signals.

According to an embodiment, processing circuit 305 is configured to process the detection signals by applying one or more compensation functions. The one or more compensation functions are determined based on pixel circuit gain functions. For each pixel circuit of the multiple pixel circuits, a pixel circuit gain function includes a set of pixel circuit related values that includes a sub-set of border region pixel circuit related values. The sub-set of border region pixel circuit related values is located within a border region of the pixel circuit dynamic range. The border region of the pixel circuit dynamic range includes a border between the first part of the pixel circuit dynamic range and the second part of the pixel circuit dynamic range.

According to an embodiment, a first pixel circuit gain function is learnt based on first pixel circuit related values associated with the first pixel circuit.

According to an embodiment, the first pixel circuit gain function is applied on a second pixel circuit—thereby reducing the resources allocated for calculating the second pixel circuit gain function.

The selection of the first pixel circuit and the second pixel circuit may be determined in any manner—for example—by testing similarities between the pixel circuit gain function of the first pixel circuit and the pixel circuit gain function of the second pixel circuit.

According to an embodiment, a first pixel circuit gain function is learnt based on pixel circuit related values associated with a first cluster of pixel circuits that includes the first pixel circuit. The first pixel circuit gain function is applied on the pixel circuits of the first cluster of pixel circuits. A cluster may include any number of pixel circuits—for example a three by three cluster or larger clusters. According to an embodiment, the cluster includes adjacent pixel circuits.

According to an embodiment, a first cluster pixel circuit gain function is learnt based on pixel circuit related values associated with at least some of the pixel circuits of a first cluster of pixel circuits.

a. According to an embodiment, the first cluster pixel circuit gain function is applied on one or more pixel circuits of the first cluster of pixel circuits.

b. According to an embodiment, the first cluster pixel circuit gain function is applied on one or more pixel circuits of a second cluster of pixel circuits that differs from the first cluster of pixel circuits. The selection of the first cluster of pixel circuits and the second cluster of pixel circuits may be determined in any manner—for example testing similarities between the gain function of one or more pixel circuits of the first cluster pixel circuit and the gain function of one or more pixel circuits of the second cluster of pixel circuits.

According to an embodiment of the invention a first pixel circuit gain function is learnt based on a function (for example average, weighted sum, mean value, standard deviation, or any other function) applied on pixel circuit related values associated with the pixel circuits of the first cluster of pixel circuits.

According to an embodiment, the inspection includes an imager (not shown) for illuminating the sample and directing light from the sample towards the sensing unit.

A non-limiting example of an inspection system is the ENLIGHT™ optical inspection of Applied Materials Inc. of Santa Clara, California. USA—which is modified to apply method 100.

According to an embodiment, the processing circuit is implemented as a central processing unit (CPU). According to an embodiment, the processing circuit is implemented as a graphic processing unit (GPU). According to an embodiment, the processing circuit is implemented as a hardware accelerator. According to an embodiment, the processing circuit includes one or more other integrated circuits such as application-specific integrated circuits (ASICs) or field programmable gate arrays (FPGAs) or full-custom integrated circuits.

In the foregoing detailed description, numerous specific details are set forth in order to provide a thorough understanding of the embodiments of the disclosure.

However, it will be understood by those skilled in the art that the present embodiments of the disclosure may be practiced without these specific details. In other instances, well-known methods, procedures, and components have not been described in detail so as not to obscure the present embodiments of the disclosure.

The subject matter regarded as the embodiments of the disclosure is particularly pointed out and distinctly claimed in the concluding portion of the specification. The embodiments of the disclosure, however, both as to organization and method of operation, together with objects, features, and advantages thereof, may best be understood by reference to the following detailed description when read with the accompanying drawings.

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

Because the illustrated embodiments of the disclosure may for the most part, be implemented using electronic components and circuits known to those skilled in the art, details will not be explained in any greater extent than that considered necessary as illustrated above, for the understanding and appreciation of the underlying concepts of the present embodiments of the disclosure and in order not to obfuscate or distract from the teachings of the present embodiments of the disclosure.

Any reference in the specification to a system should be applied mutatis mutandis to a method that may be executed by the system and should be applied mutatis mutandis to a computer program product that stores instructions that can be executed by the system.

Any reference in the specification to a computer program product should be applied mutatis mutandis to a method that may be executed when executing instructions stored in the computer program product and should be applied mutandis to a system that is configured to executing instructions stored in the computer program product.

The term "and/or" means additionally or alternatively. For example A and/or B means only A, or only B or A and B.

In the foregoing description, numerous specific details are set forth in order to provide a thorough understanding of the embodiments of the disclosure.

However, it will be understood by those skilled in the art that the present embodiments of the disclosure may be practiced without these specific details. In other instances, well-known methods, procedures, and components have not been described in detail so as not to obscure the present embodiments of the disclosure.

The subject matter regarded as the embodiments of the disclosure is particularly pointed out and distinctly claimed in the concluding portion of the specification. The embodiments of the disclosure, however, both as to organization and method of operation, together with objects, features, and advantages thereof, may best be understood by reference to the following detailed description when read with the accompanying drawings.

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

The term "and/or" means additionally or alternatively. For example, A and/or B means only A, or only B or A and B.

In the foregoing specification, the embodiments of the disclosure have been described with reference to specific examples of embodiments. It will, however, be evident that various modifications and changes may be made therein without departing from the broader spirit and scope of the appended claims.

Moreover, the terms "front," "back," "top,", "bottom," "over," "under" and the like in the description and in the claims, if any, are used for descriptive purposes and not necessarily for describing permanent relative positions. It is understood that the terms so used are interchangeable under appropriate circumstances such that the embodiments of the disclosure described herein are, for example, capable of operation in other orientations than those illustrated or otherwise described herein.

Any reference to the term "comprising" or "having" or "including" should be applied mutatis mutandis to "consisting" and/or should be applied mutatis mutandis to "consisting essentially of".

However, other modifications, variations and alternatives are also possible. The specifications and drawings are, accordingly, to be regarded in an illustrative rather than in a restrictive sense.

In the claims, any reference signs placed between parentheses shall not be construed as limiting the claim. The word 'comprising' does not exclude the presence of other elements or steps then those listed in a claim. Furthermore, the terms "a" or "an," as used herein, are defined as one or more than one. Also, the use of introductory phrases such as "at least one" and "one or more" in the claims should not be construed to imply that the introduction of another claim element by the indefinite articles "a" or "an" limits any particular claim containing such introduced claim element to embodiments containing only one such element, even when the same claim includes the introductory phrases "one or more" or "at least one" and indefinite articles such as "a" or "an." The same holds true for the use of definite articles. Unless stated otherwise, terms such as "first" and "second" are used to arbitrarily distinguish between the elements such terms describe. Thus, these terms are not necessarily intended to indicate temporal or other prioritization of such elements. The mere fact that certain measures are recited in mutually different claims does not indicate that a combination of these measures cannot be used to advantage.

While certain features of the embodiments have been illustrated and described herein, many modifications, substitutions, changes, and equivalents will now occur to those of ordinary skill in the art. It is, therefore, to be understood that the appended claims are intended to cover all such modifications and changes as fall within the true spirit of the embodiment.

What is claimed is:

1. A method for sensing circuit compensation, the method comprising:

acquiring, by multiple pixel circuits, groups of images of a target, wherein different groups of images are acquired at different illumination intensities, wherein for each group of images, different images of the group of images are acquired at a same illumination intensity, wherein different pixel circuits of the multiple pixel circuits are associated with different image pixels of each of the images; each pixel circuit comprises (a) a first sub-circuit associated with at least a first part of a pixel circuit dynamic range, and (b) a second sub-circuit associated with a second part of the pixel circuit dynamic range;

determining, based on the groups of images, pixel circuit related values associated with the multiple pixel circuits;

determining, per pixel circuit of the multiple pixel circuits, a pixel circuit gain function based on pixel circuit related values associated with the pixel circuit to provide pixel circuit gain functions, wherein determining the pixel circuit gain functions comprises determining, for each pixel circuit, parts of the pixel circuit gain function per each pair of adjacent pixel circuit related values, and wherein at least one part of the pixel circuit related values is linear and at least one part of the pixel circuit related values is nonlinear; and determining one or more compensation functions for compensating for differences between the multiple gain functions of the multiple pixel circuits;

wherein for each pixel circuit of the multiple pixel circuits, the pixel circuit is associated with a group of pixel circuit related values that comprise a sub-set of border region pixel circuit related values that are located within a border region of the pixel circuit dynamic range, the border region of the pixel circuit dynamic range comprises a border between the first part of the pixel circuit dynamic range and the second part of the pixel circuit dynamic range.

2. The method according to claim 1, wherein for each pixel circuit, the sub-set of border region pixel circuit related values comprises more than three border region pixel circuit related values.

3. The method according to claim 1, wherein for each pixel circuit, a density of the border region pixel circuit related values exceeds a density of pixel circuit related values located outside the border region.

4. The method according to claim 1, wherein for each pixel circuit, the border region is less than a fifth of the pixel circuit dynamic range.

5. The method according to claim 1, wherein the determining of the pixel circuit gain functions comprises averaging, per pixel circuit, values of image pixels that are associated with the pixel circuit and belong to a same group of images.

6. The method according to claim 1, wherein the groups of images are a first number of groups of images, wherein the method further comprises adjusting at least one of the pixel circuit gain functions based on an acquisition of a second number of groups of images, the second number is lower than the first number.

7. A method for image acquisition, the method comprises:

generating, by multiple pixel circuits, detection signals that are related to a sample; wherein each pixel circuit comprises (a) a first sub-circuit associated with at least a first part of a pixel circuit dynamic range, and (b) a second sub-circuit associated with a second part of the pixel circuit dynamic range;

reading, by a readout circuit, the detection signals; and processing the detection signals by applying one or more compensation functions; wherein the one or more compensation functions are determined based on pixel circuit gain functions, wherein for each pixel circuit of the multiple pixel circuits, a pixel circuit gain function comprises a set of a group of pixel circuit related values that comprise a sub-set of border region pixel circuit related values that are located within a border region of the pixel circuit dynamic range, the border region of the pixel circuit dynamic range comprises a border between the first part of the pixel circuit dynamic range and the second part of the pixel circuit dynamic range.

8. An inspection system, comprising:

multiple pixel circuits that are configured to generate, detection signals that are related to a sample; wherein each pixel circuit comprises (a) a first sub-circuit associated with at least a first part of a pixel circuit dynamic range, and (b) a second sub-circuit associated with a second part of the pixel circuit dynamic range;

a readout circuit that is configured to read the detection signals; and a processing circuit that is configured to process the detection signals by applying one or more compensation functions; wherein the one or more compensation functions are determined based on pixel circuit gain functions, wherein for each pixel circuit of the multiple pixel circuits, a pixel circuit gain function comprises a set of a group of pixel circuit related values that comprise a sub-set of border region pixel circuit related values that are located within a border region of the pixel circuit dynamic range, the border region of the pixel circuit dynamic range comprises a border between the first part of the pixel circuit dynamic range 5 and the second part of the pixel circuit dynamic range.

9. The inspection system according to claim 8, wherein for each pixel circuit, the sub-set of border region pixel circuit related values comprises more than three border region pixel circuit related values. 10

10. The inspection system according to claim 8, wherein for each pixel circuit, a density of the border region pixel circuit related values exceeds a density of pixel circuit related values located outside the border region.

11. The inspection system according to claim 8, wherein 15 for each pixel circuit, the border region is less than a fifth of the pixel circuit dynamic range.

* * * * *